(12) United States Patent
Murata (10) Patent No.: US 6,976,264 B2
(45) Date of Patent: Dec. 13, 2005

(54) ADAPTOR FOR OPTICAL DISK (75) Inventor: Masato Murata, Osaka (JP)

(73) Assignee: Orient Instrument Computer Co. Ltd., Osaka (JP)

( * ) Notice: Subject to any disclaimer, the term of this patent is extended or adjusted under 35 U.S.C. 154(b) by 25 days.

(21) Appl. No.: 10/333,813

(22) PCT Filed: Jul. 27, 2001

(86) PCT No.: PCT/JP01/06477

§ 371 (c)(1),
(2), (4) Date: Apr. 22, 2003

(87) PCT Pub. No.: WO02/11143

PCT Pub. Date: Feb. 7, 2002

(65) Prior Publication Data

US 2003/0179695 A1    Sep. 25, 2003

(30) Foreign Application Priority Data

Jul. 27, 2000    (JP)    ............................. 2000-227458

(51) Int. Cl.[7] .......................................... G11B 23/38
(52) U.S. Cl. ...................................................... 720/720
(58) Field of Search ............................... 720/720, 724, 720/721; 369/289, 280

(56) References Cited

U.S. PATENT DOCUMENTS

| | | | | |
|---|---|---|---|---|
| 5,003,530 | A * | 3/1991 | Yamamori | 720/720 |
| 5,204,853 | A * | 4/1993 | Kamoshita | 720/720 |
| 6,612,762 | B1 * | 9/2003 | Sakurai et al. | 400/542 |
| 6,779,193 | B2 * | 8/2004 | Boissonneault et al. | 720/720 |
| 2002/0114255 | A1 * | 8/2002 | Kaneko et al. | 369/77.1 |

FOREIGN PATENT DOCUMENTS

| | | | |
|---|---|---|---|
| JP | 63-228455 A | 9/1988 | |
| JP | 63228455 A * | 9/1988 | ........... G11B 17/04 |
| JP | 01-213858 A | 8/1989 | |
| JP | 6-12810 | 1/1994 | |
| JP | 9-282826 | 10/1997 | |
| JP | 2596256 Y2 | 4/1999 | |
| JP | 2001-291350 A | 10/2001 | |

* cited by examiner

*Primary Examiner*—Tan Dinh
*Assistant Examiner*—Mark Blouin
(74) *Attorney, Agent, or Firm*—Watchstone P & D; Stephen B. Parker (57)    ABSTRACT

An optical disk adapter can position a deformed CD at a predetermined position in a disk-transferring tray by a very simple operation, and is simple in structure and easy in manufacture. At the central portion of an adapter main body (1*a*) having an external periphery with the same diameter as a 12 cm-CD, a positioning true circular central aperture (2) in which a square CD (C1) with an 8 cm-diagonal length can be fitted in a non-restricted state is provided. The center of this positioning true central aperture (2) is concentric with the center of the adapter main body (1*a*). The adapter main body (1*a*) is provided with a rotation prevention protrusion (3) against the disk-transferring tray (71) at the lower surface thereof and a disk clamper passing dented portion (4) at the upper surface thereof. The rotation prevention protrusion (3) has a thickness which can serve as an optical disk entering prevention protruded portion, and is provided with a protrusion (5) which comes into contact with a chassis (82) of a driving unit (81) in a cabinet at a lower surface thereof, whereby the rear end of the adapter is lifted from the 12 cm-disk placing dented portion (72) when the driving unit (81) is lifted.

5 Claims, 11 Drawing Sheets

ADAPTOR FOR OPTICAL DISK

This application is a 371 of PCT/JP01/06477 Jul. 27, 2001.

TECHNICAL FIELD

The present invention relates to an optical disk adapter for fitting an optical disk smaller than a diameter of 12 cm to a tray-type disk-loading device of a disk player equipped to a computer, etc.

In this specification, "disk player" includes an apparatus for writing information onto CD-Rs, a copying machine, etc. as well as an apparatus for reading out recorded information of optical disks.

BACKGROUND ART

Conventionally, in compact disks in which information is stored (hereinafter referred to as "CD"), a CD having a true round shape with a diameter of 12 cm or 8 cm is defined as a standard size. In a disk player for reading out information on CDs, a disk player is designed to have a size corresponding to the standard size.

The aforementioned disk players can be roughly classified into several types. Known as one of the types is a disk player P that employs a tray-type disk loading device equipped with a disk-transferring tray 71 having a 12 cm-CD placing dented portion 72 and an 8 cm-CD placing dented portion 73 formed in the 12 cm-CD placing dented portion 72 (see Japanese Unexamined Laid-open Patent Publication H7-50054A).

Figure 16:
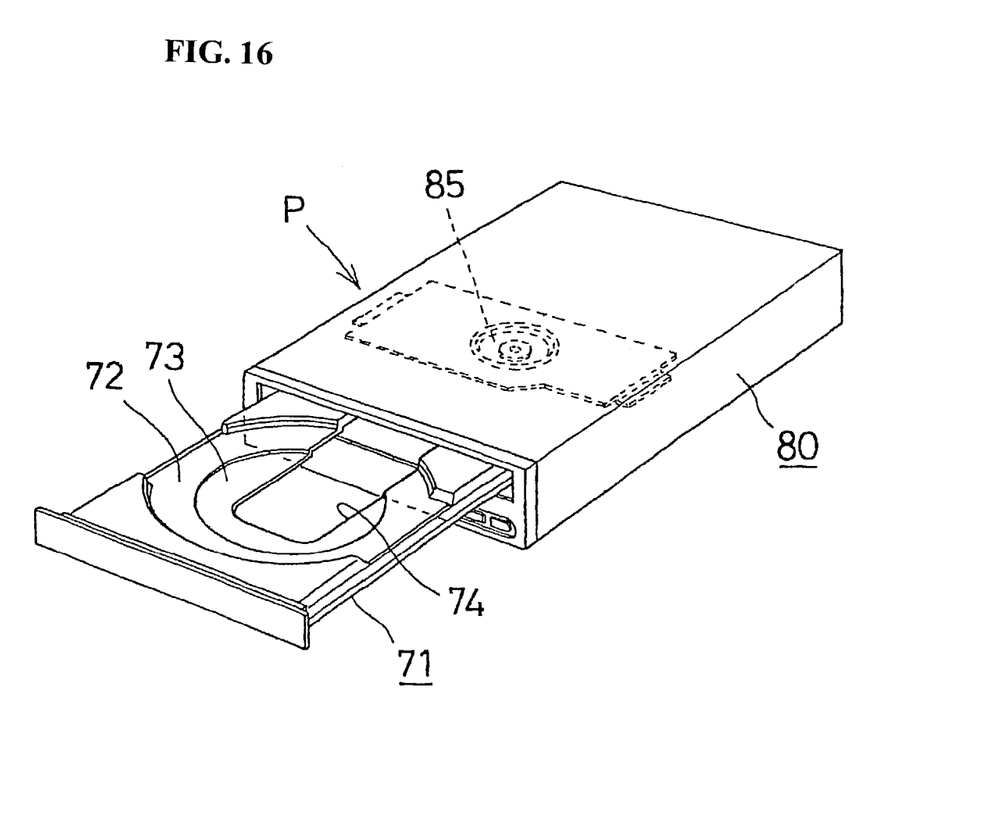
FIG. 16 is an entire perspective view showing a disk player employing a tray-type disk loading device.

As shown in FIG. 16, this disk player P is provided with a cabinet 80 and a disk-transferring tray 71 that can be ejected from and inserted into the cabinet 80. In this disk player P, when the disk-transferring tray 71 is inserted into the cabinet 80 with a CD (C) placed on the 12 cm-CD placing dented portion 72 or the 8 cm-CD placing dented portion 73, the CD (C) is automatically transferred to the stored information readable position in the cabinet 80.

Figure 17:
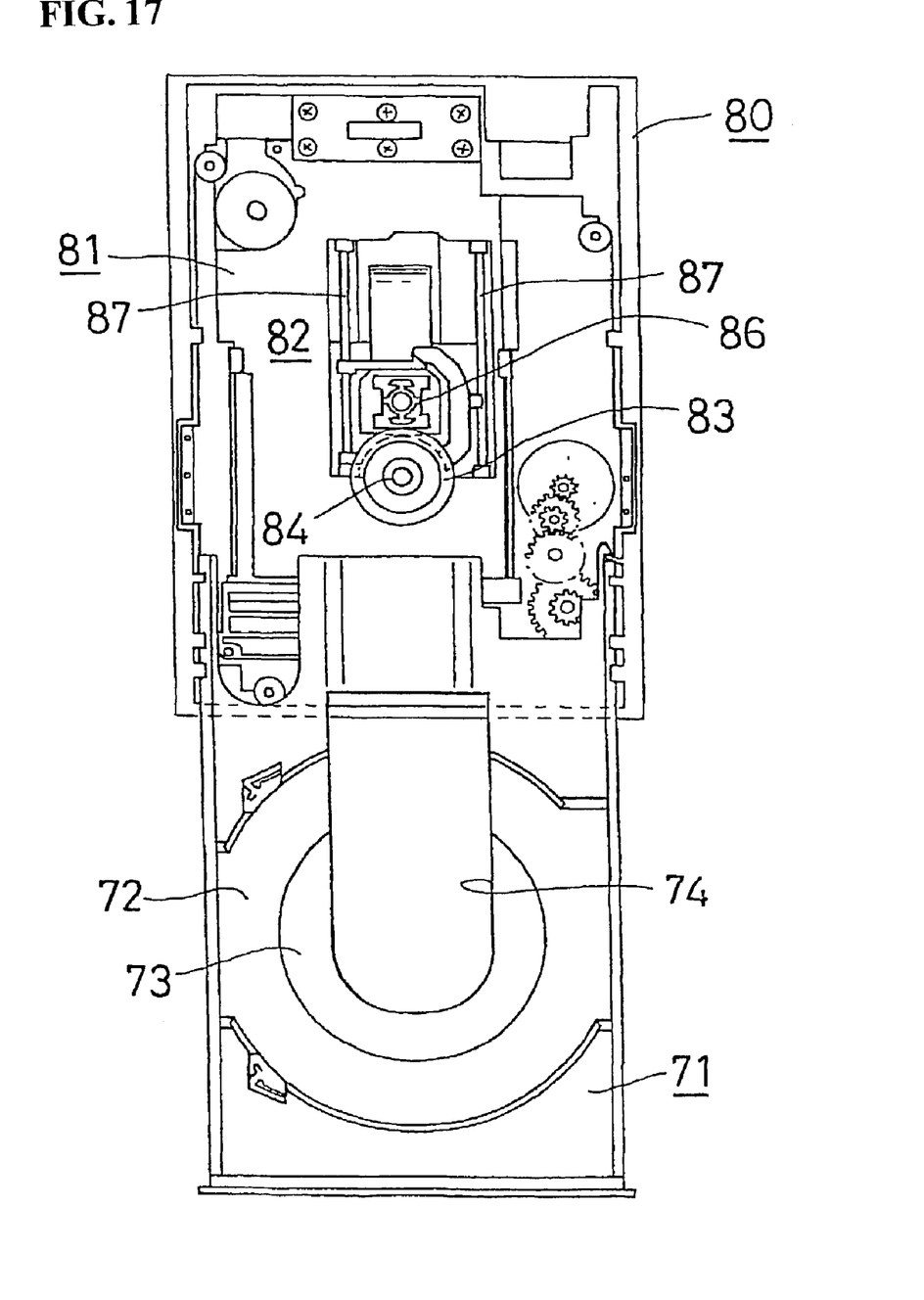
FIG. 17 is a plan view showing the state in which the disk-transferring tray of this disk player is pulled out from the cabinet.

In order to attain the above, as shown in FIGS. 17 and 19 to 21, in the cabinet 80, a chassis 82 of a drive unit 81 which holds an optical pickup 86 and a disk turntable 83 is pivotably supported at its rear end portion about a horizontal axis 90. The disk turntable 83 equipped with a magnetic disk chuck 84 is provided at the tip portion of the chassis 82, while an iron metal disk clamper 85 horizontally rotatable is provided above the turntable 83. In the state in which the tray is ejected as shown in FIGS. 16 and 17, the chassis 82 is inclined downward (see FIG. 19).

Figure 18:
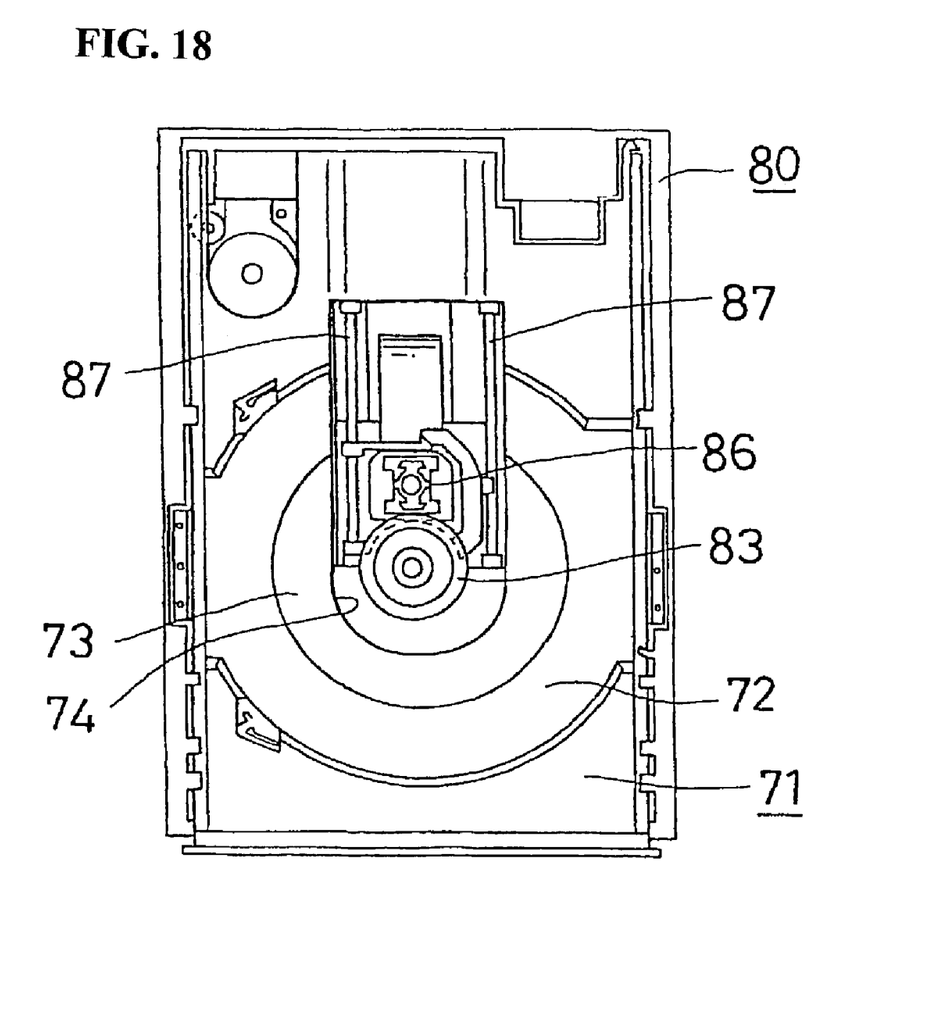
FIG. 18 is a plan view showing the state in which the disk-transferring tray of this disk player is inserted in the cabinet.

As shown in FIG. 18, as soon as the disk-transferring tray 71 is completely inserted in the cabinet 80 from the ejected state, the chassis 82 inclined downward is pivoted upward on the horizontal axis 90 as a pivotal axis. Then, the disk chuck 84 is inserted into the central aperture Ca of the CD (C) on the disk-transferring tray 71 from the lower side thereof, and the disk chuck 84 is attracted to the disk clamper 85, i.e., the so-called chucking is performed. By this chucking, the CD (C) is pressed against the disk clamper 85 and pinched by and between the disk clamper 85 and the disk turntable 83, and therefore the CD (C) is rotated together with the disk turntable 83 by the disk turntable driving motor 88. The height position of this disk turntable 83 at the time of revolution is set such that the lower surface of the CD (C) is slightly lifted above the upper surface of the 12 cm-CD disposing dented portion 72 so as not to cause the mutual contact during the revolution.

To the chassis 82, the optical pickup 86 is movably provided via a pair of right and left guide shafts 87 and 87 disposed along the longitudinal direction of the chassis 82. Since this optical pickup 86 is moved in close vicinity to the lower surface of the CD (C), a cutout 74 is formed in the 8 cm-CD placing dented portion 73 of the disk-transferring tray 71 extending from the central portion to the end portion of the loading direction side.

Recently, non-standard sized CDs, such as rectangular card shaped CDs (hereinafter referred to as "card-type CD" and a non-standard sized CD including the "card-type CD" will be referred to as "deformed CD"), start to appear because of the attractive appearance thereof. In a disk player using the aforementioned tray-type disk loading device, however, such a card-type CD requires an adapter as proposed by Japanese Unexamined Laid-open Patent Public No. 2000-11573A because of the following reasons. Although a CD is required to be transferred to the appropriate position in the cabinet 80 as mentioned above, the correct positioning of a deformed CD is hardly performed by the aforementioned disk-transferring tray 71.

In short, the adapter is formed into an annular shape and provided with an external periphery having the same diameter as that of a 12 cm-CD, a central dented portion for fitting a card-type CD and a holding means for maintaining the fitted state. The adapter rotates together with the CD.

At the time of using the adapter, however, it is required to operate certain CD holding means equipped to the adapter in order to fix the CD to the adapter. This is troublesome operation in cases where a number of deformed CDs have to be loaded in the disk player repeatedly in a short time.

Furthermore, in adapters equipped with holding means, an adapter which can fix a CD easily is high in manufacturing cost, while an adapter which is low in manufacturing cost requires complicated CD fixing operations.

The present invention was made in view of the aforementioned technical background, and aims to provide an optical disk adapter which is capable of performing a predetermined positioning of a deformed CD in a disk-transferring tray with a very simple operation, simple in structure and easy in manufacture

DISCLOSURE OF INVENTION

As a result of hard study by the applicant, the applicant recognized the fact that in a disk player employing a tray-type disk loading apparatus it is not always necessary for an adapter to rotate together with a CD although a conventional adapter is designed to be integrally fixed to a CD so as to cope with any types of disk players, and then completed the present invention.

According to the present invention, an optical disk adapter is characterized in that the optical disk adapter is provided with an external periphery having a size that can be fitted in a 12 cm-disk placing dented portion of a disk-transferring tray in a disk player and a positioning central aperture in which an optical disk having a size smaller than that of a 12 cm-optical disk is fitted in a non-restricted state, wherein a center of the positioning central aperture and that of an adapter main body are positioned concentrically.

The aforementioned "an optical disk having a size smaller than that of a 12 cm-optical disk is fitted in a non-restricted state" means that, although a 12 cm-CD of standard size can be slightly moved in the radial direction relative to a 12 cm-CD placing dented portion of the disk-transferring tray, the optical disk is allowed to move in the radial direction in the positioning central aperture in the same degree that the positioning to the chucking position can be performed.

According to the present invention, after disposing the adapter on the disk placing dented portion of the disk-transferring tray, when an optical disk is fitted in the positioning central aperture of the adapter and then the disk-transferring tray is inserted into the cabinet, the optical disk is correctly positioned to the chucking position in the cabinet, and therefore a chucking can be performed assuredly.

The positioning central aperture may have a configuration corresponding to a deformed optical disk or a true circular configuration slightly larger than the maximum diameter of the deformed optical disk.

In cases where the moving speed of the disk-transferring tray is set to be relatively faster, the optical disk fitted in the positioning true circular central aperture in a non-restricted state may slide over the adapter at the time of inserting the tray into the cabinet. To overcome this problem, it is preferable that at least a height of an inner periphery of the optical disk adapter is set to be higher than a thickness (1.2 mm) of the optical disk.

In cases where the thickness of the adapter is increased, the adapter is provided with a dented portion for allowing a relative passing of a disk clamper in the disk player at an upper surface thereof and a rotation prevention for preventing a rotation of the adapter against the disk-transferring tray at a lower surface thereof. It is reasonable that this rotation prevention comes into contact with the pair of opposed inner edges of the cutout of the disk-transferring tray.

In cases where the optical disk is smaller and the disk-transferring tray is provided with an 8 cm-CD placing dented portion, the optical disk may enter the underside of the adapter. To avoid this problem, it is preferable that the optical disk adapter is provided with an optical disk entering prevention protrusion on a lower surface of the disk damper passing dented portion. Since the optical disk entering prevention protrusion are not allowed to exert a bad influence to the movement of the optical pickup, it is required that the adapter is supported in a state in which the rear end thereof is lifted from the bottom surface of the disk placing dented portion. To attain this, by providing a protruded portion which comes into contact with a driving unit for holding an optical pickup and a disk turntable, the driving unit pushes the protruded portion upward in accordance with the upward movement of the driving unit, whereby the lift-up can be attained.

The protrusion may come into contact with an upper surface of a chassis of the driving unit or an upper surface of an optical pickup guide shaft.

Furthermore, in cases where an optical disk is copied with an automatic copying machine, due to the vibrations of the arm driving unit for transferring an optical disk, in the state in which a part of the adapter is lifted, the adapter may resonate or vibrate laterally to cause damages to the optical disk or the inside of the player. Therefore, a means for preventing such resonance and vibrations is required. To attain this, it is preferable that an adapter main body includes a lower half member to be fixed to the disk-transferring tray and an upper half member connected to the lower half member with a front end portion thereof connected to that of the lower half member via a hinge portion. In this case, the lower half member is provided with a positioning central aperture in which an optical disk smaller than an 8 cm-optical disk in a non-restricted state is fitted and a cutout continuing from the central aperture for allowing a movement of an optical pickup, while the upper half member is provided with a disk damper passing dented portion, an optical disk entering prevention protruded portion and a protruded portion which comes into contact with a driving unit. In accordance with the upward movement of the driving unit, the upper half member is supported in a state in which the rear end is lifted from the lower half member about the hinge portion as fulcrum.

BEST MODE FOR CARRYING OUT THE INVENTION

The present invention will be described with reference to the attached drawings.

FIGS. 1 to 6 show an optical disk adapter 1 of the first embodiment according to the present invention. The adapter main body 1a is made of synthetic resign and formed to have an external periphery having the same size as that of a 12 cm-CD. At the center thereof, a positioning true circular central aperture 2 for holding a square deformed CD (C1) having a diagonal length of about 8 cm in a non-restrained state is formed. The center of the positioning true circular central aperture 2 and that of the adapter main body 1a are set concentrically.

Figure 1:
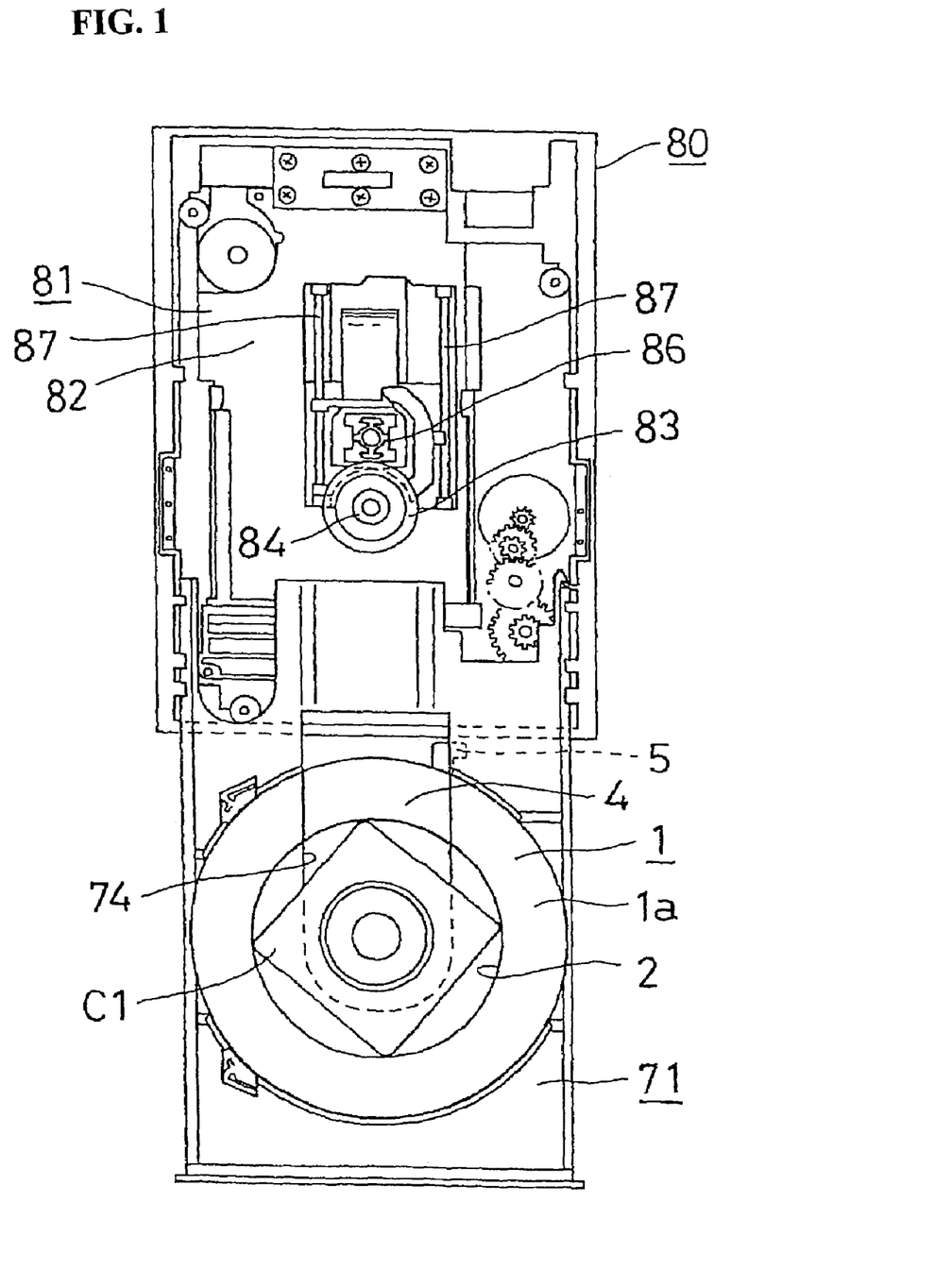
FIG. 1 is a plan view showing the state in which the optical disk adapter of the first embodiment according to the present invention is disposed on the disk-transferring tray pulled out from the disk player.
Figure 2:
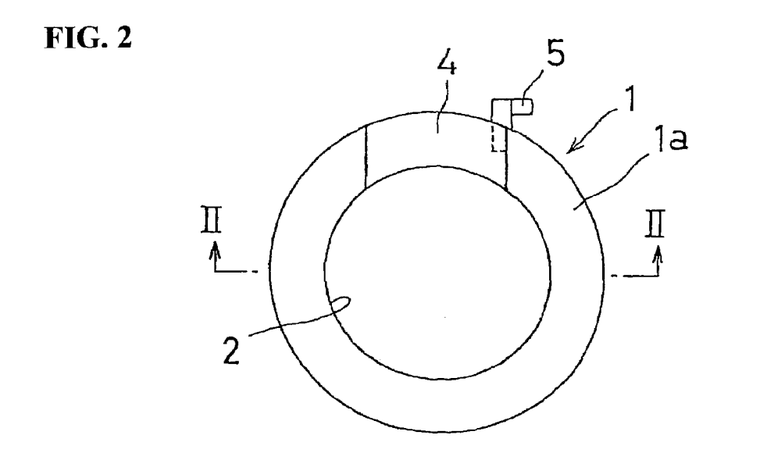
FIG. 2 is a plan view of the adapter.
Figure 3:
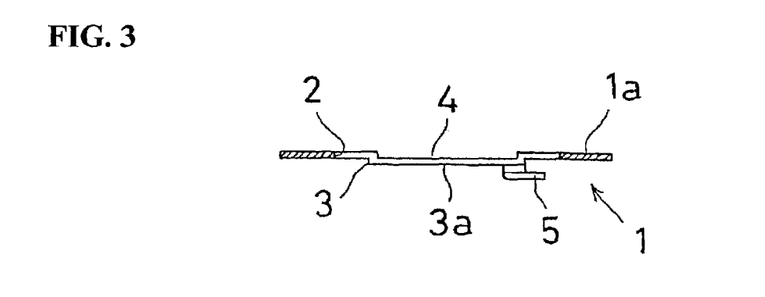
FIG. 3 is a cross-sectional view taken along the line II—II in FIG. 2.
Figure 4:
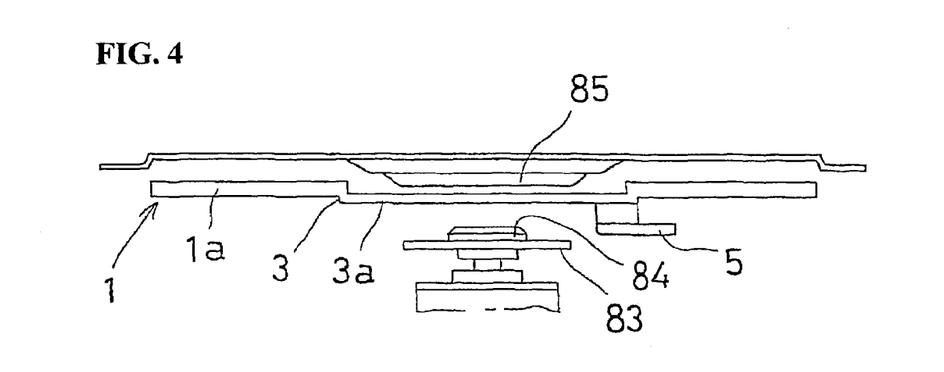
FIG. 4 is a schematic view showing the state in which the adapter passes below the disk damper of the disk player.

On the lower surface of the adapter 1, a turn-prevention protruded portion 3 to be fitted in the cutout 74 of the disk-transferring tray 71 is protruded. The turn-prevention protruded portion 3 is designed such that both sides thereof come into contact with the inner edges of the cutout 74 and the lower portion 3a thereof can serve as an optical disk entering prevention protrusion.

Figure 5:
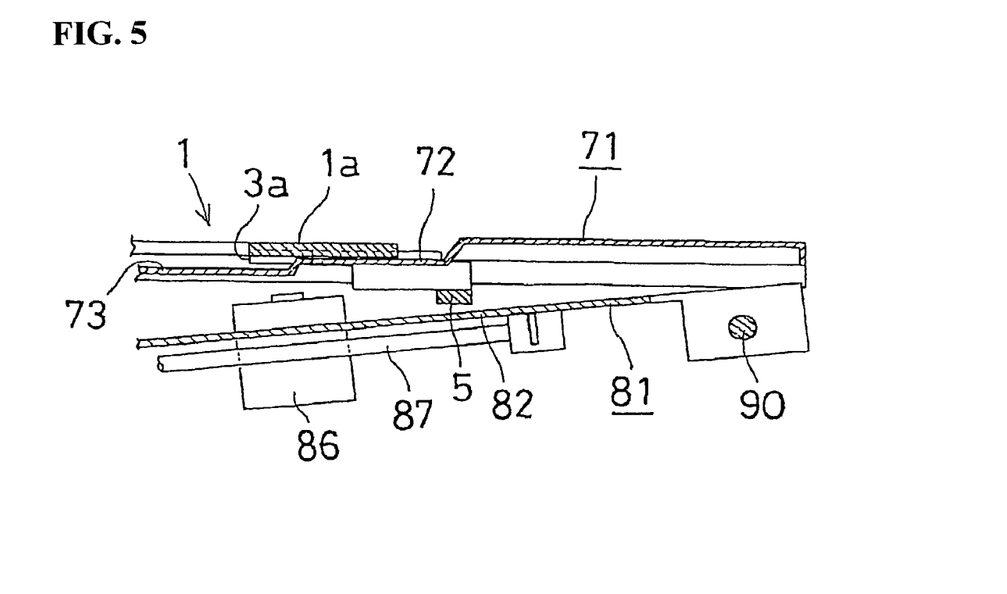
FIG. 5 is a principal part cross-sectional view showing the state immediately before the raising of the rear end portion of the adapter.
Figure 6:
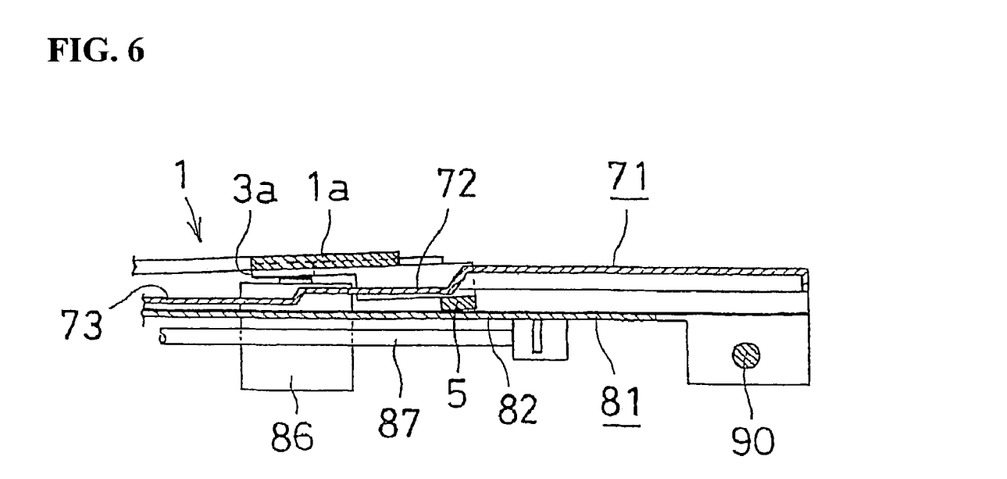
FIG. 6 is a principal part cross-sectional view showing the state in which the rear end portion of the adapter is raised.

When the driving unit 81 having the optical pickup 86 and the disk turntable 83 of the disk player P moves upwards, the protruded portion 5 comes into contact with the upper surface of the chassis 82 of the driving unit 81. Thus, the rear end of the adapter main body 1a is supported in a state in which the rear end is lifted above the bottom surface of the 12 cm-disk placing dented portion 72. Although the protruded portion 5 is provided only at the right-hand side in relation to the player P, such protruded portion 5 may be provided at both sides in relation to a player P.

In this embodiment, the thickness of the adapter main body 1a is set to be 2.5 mm, the thickness of the turn prevention protruded portion 3 is set to be 3.9 mm, and the depth of the disk clamper passing dented portion 4 is set to be 1.0 mm.

The usage of the aforementioned adapter 1 and the operation thereof in the disk player 80 will be explained as follows. As shown in FIG. 1, first, the disk-transferring tray 71 is ejected from the cabinet 80. Then, the adapter 1 is placed on the 12 cm-CD placing dented portion 72 of the disk-transferring tray 71 such that the turn prevention protruded portion 3 formed on the lower surface of the adapter fits in the cutout 74 of the disk-transferring tray 71. Thereafter, the CD (C1) is fitted in the positioning true circular central aperture 2 of the adapter 1. Thus, the setting of the CD (C1) to the adapter 1 can be completed. In this state, the square deformed CD (C1) is disposed substantially on the 8 cm-CD disposing dented portion 73.

Figure 19:
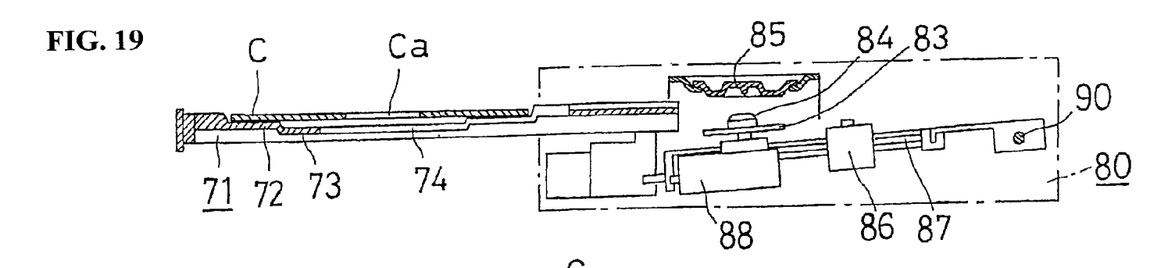
FIG. 19 is a principal part cross-sectional view showing the state in which the disk-transferring tray of this disk player is pulled out from the cabinet.
Figure 20:
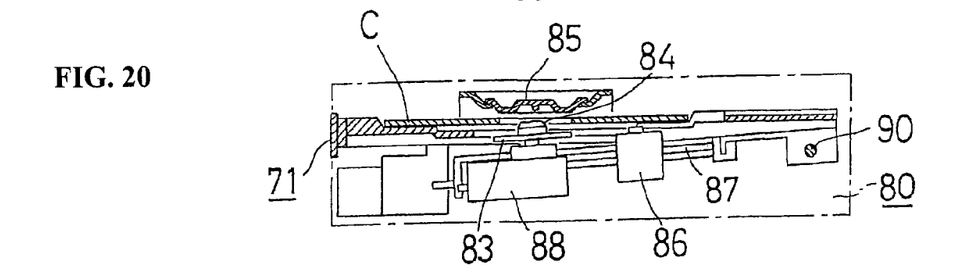
FIG. 20 is a principal part cross-sectional view showing the state immediately before the raising of the disk chuck in a state in which the disk-transferring tray is inserted in the cabinet.
Figure 21:
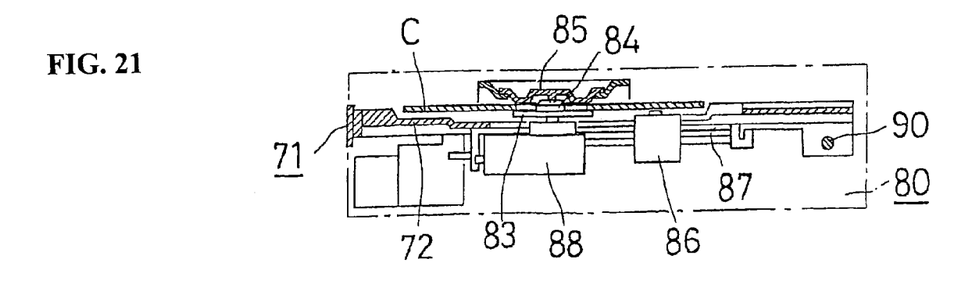
FIG. 21 is a principal cross-sectional view showing the chucking state.
Figure 22:
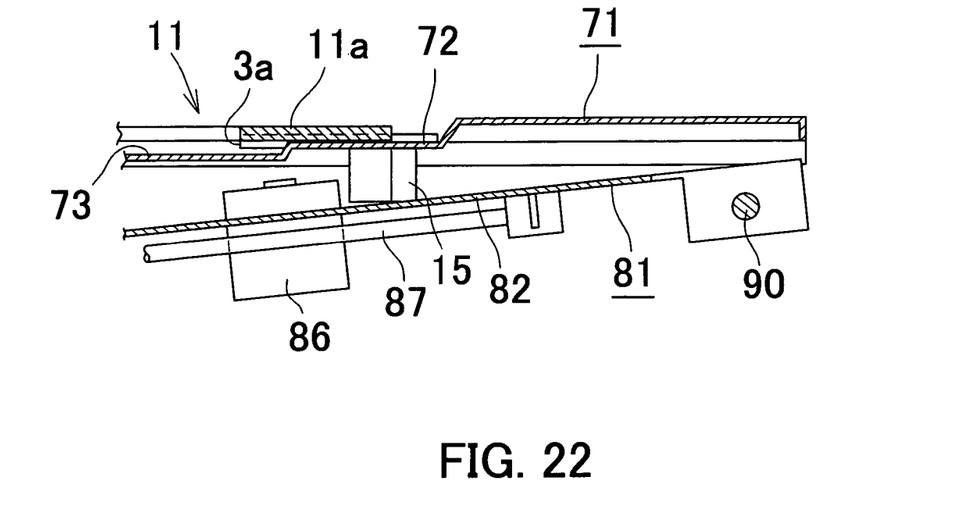
FIG. 22 is a schematic cross-sectional view showing the state immediately before the raising of the rear end portion of an adapter according to a second embodiment of the present invention, wherein the adapter is provided with a protrusion which comes in contact with an upper surface of an optical pickup guide shaft.
Figure 23:
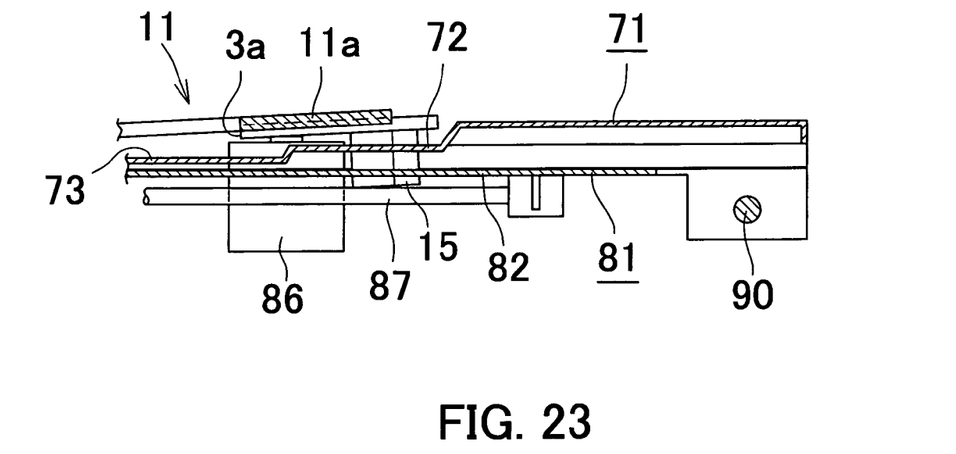
FIG. 23 is a schematic cross-sectional view showing the state in which the rear end portion of the adapter is lifted up.

When the disk-transferring tray 71 is pushed into the cabinet 80, although the adapter 1 passes below the disk clamper 85 in the cabinet 80, since the adapter 1 is provided with the disk clamper passing dented portion 4, the adapter 1 having a certain thickness can be moved toward the rear portion in the cabinet 80 without coming into contact with the disk clamper 85. When the disk-transferring tray 71 is located at the predetermined rearmost portion, the disk chuck 83 is inserted into the central aperture 10 of the deformed CD from the beneath in the same way as shown in FIGS. 19 to 21. Furthermore, the disk chuck 83 is attracted to the disk clamper 85 and therefore the CD (C1) is pressed against the disk clamper 85. Thus, the CD (C1) is supported by and between the disk clamper 85 and the disk turntable 83.

Furthermore, in accordance with the upward movement of the disk chuck 84, i.e., the upward movement of the chassis 82 of the driving unit 81, the protruded portion 5 comes into contact with the upper surface of the chassis 82. Therefore, the rear end of the adapter main body 1a is supported in the state in which the rear end is lifted from the bottom surface of the 12 cm-disk placing dented portion 72. Consequently, as shown in FIG. 6, the rear end of the adapter main body 1a is located above the upper surface of the optical pickup 86, resulting in a smooth movement of the optical pickup 86.

Furthermore, since the deformed CD (C1) continues to move from the originally disposed position by its inertia when the movement of the disk-transferring tray 71 is terminated, the deformed CD (C1) bumps against the optical disk entering prevention protrusion 3a immediately before the lifting of the rear end of the adapter. This prevents the movement of the CD due to the inertia and the entering of the CD into the lower portion of the adapter. As a result, the CD can be held at the predetermined position where the chucking can be performed appropriately.

Figure 7:
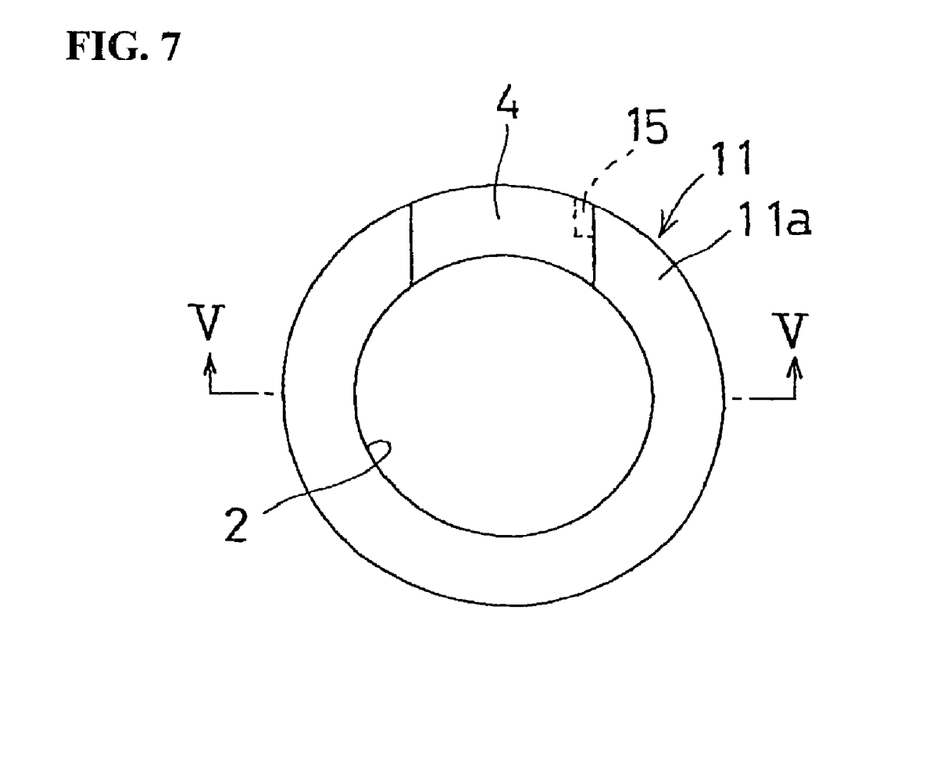
FIG. 7 is a plan view of the second embodiment of the adapter according to the present invention.
Figure 8:
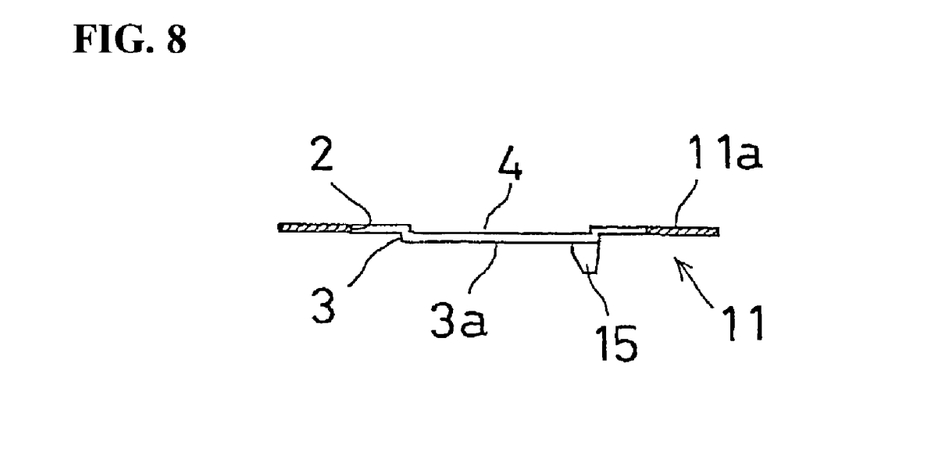
FIG. 8 is a cross-sectional view taken along the line V—V in FIG. 7.

FIGS. 7 and 8 show an optical disk adapter 11 of the second embodiment according to the present invention. The optical disk adapter is different from that of the first embodiment as follows. In the optical disk adapter according to the first embodiment, the protruded portion 5 provided on the lower surface of the adapter 1 comes into contact with the upper surface of the chassis 82 of the driving unit 81. To the contrary, in the optical adapter according to the second embodiment, the protruded portion 15 provided on the lower surface of the adapter 11 as depicted in FIGS. 7, 8, 22 and 23 comes into contact with the guide shaft 87 of the optical pickup 86. The other structures of the second embodiment are completely the same as those of the first embodiment.

Accordingly, the same reference numeral as that of the adapter 1 of the first embodiment is allotted to the corresponding portion of the second embodiment, and the detail explanation of the usage of the adapter and the operation thereof of the disk player 80 will be omitted since those are approximately the same as those of the first embodiment.

Figure 9:
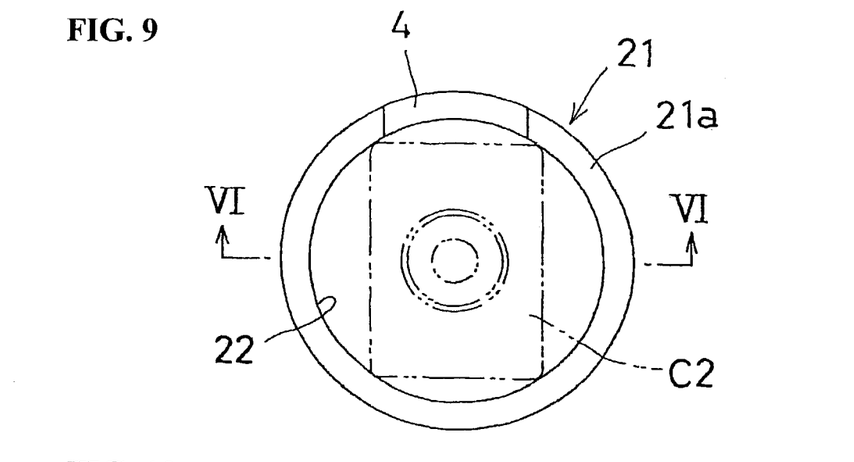
FIG. 9 is a plan view of the third embodiment of the adapter according to the present invention.
Figure 10:
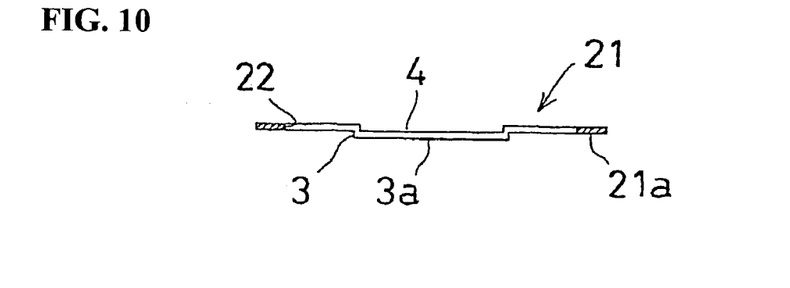
FIG. 10 is a cross-sectional view taken along the line VI—VI in FIG. 9.

FIGS. 9 and 10 show an adapter 21 of the third embodiment. The external periphery of the adapter main body 21a is formed to have the same size as that of the 12 cm-CD, and the positioning central aperture for the deformed CD (C2) is set to have a diameter of 104 mm. The reason for setting the diameter to be 104 mm is that the adapter is to be used for a card shaped deformed CD having the diagonal length of 103 mm. The card shaped deformed CD (C2) with the diagonal length of 103 mm is to be disposed on the bottom of the 12 cm-CD placing dented portion 72 in the disk-transferring tray 71. That is, the CD is disposed substantially on the same level as that of the adapter main body 21a, and therefore the entering of the deformed CD (C2) into the lower portion of the adapter will be hardly happen as compared with the case where a square deformed CD (1) is disposed on the 8 cm-CD placing dented portion 73. However, to be safe, the turn prevention protruded portion 3 is designed to have a thickness such that the lower front face of the protruded portion can also serve as an optical disk entering prevention protrusion. On the upper surface of the turn prevention protruded portion 3, a disk clamper passing dented portion 4 is provided.

Figure 11:
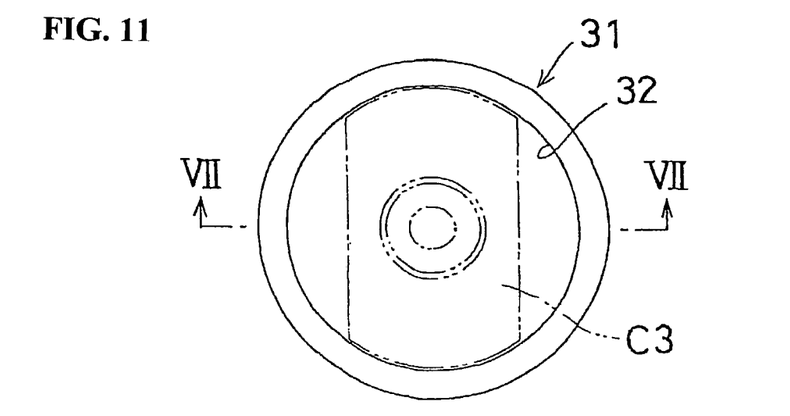
FIG. 11 is a plan view of the fourth embodiment of the adapter according to the present invention.
Figure 12:
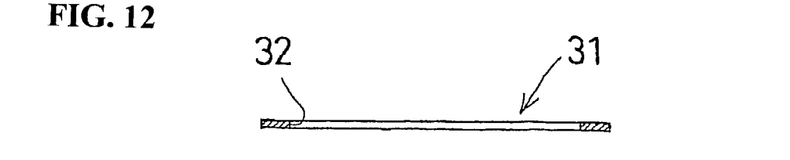
FIG. 12 is across-sectional view taken along the line VII—VII in FIG. 11.

FIGS. 11 and 12 show an adapter 31 of the fourth embodiment. The thickness is set to be 1.2 mm which is the same thickness as that of a deformed CD (C3), and the inner diameter of the deformed CD positioning true circular aperture 32 is set to be 104 mm. The adapter 31 of this embodiment can be used for a true circular CD having a size which cannot be fitted in the 8 cm-CD disposing dented portion 73 of the disk-transferring tray 71 or a card shaped non-circular deformed CD (C3) with rounded corners among nonstandard size CDs because these CDs will not cause any displacement over the adapter due to the configuration even in cases where the disk tray 71 moves more quickly.

Figure 13:
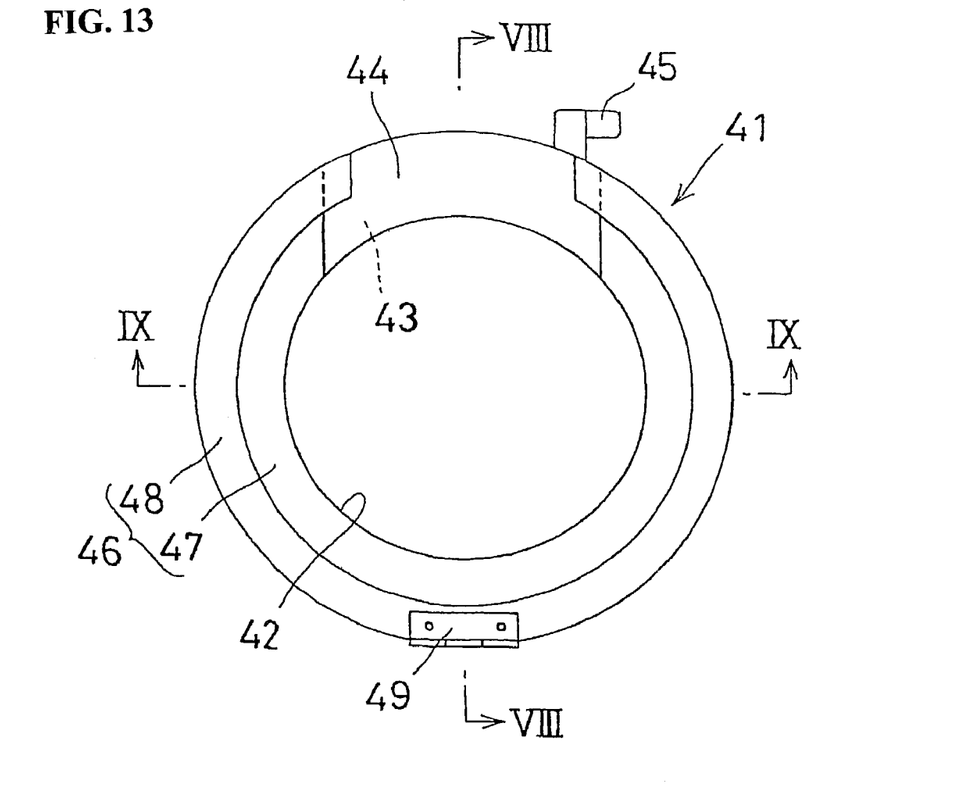
FIG. 13 is a plan view of the fifth embodiment of the adapter according to the present invention.
Figure 14:
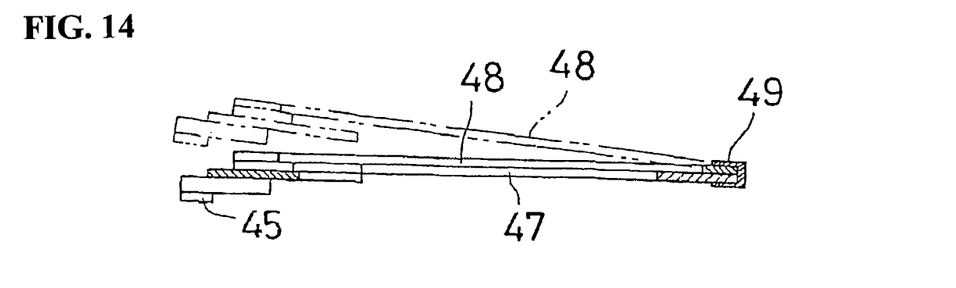
FIG. 14 is a cross-sectional view taken along the line VIII—VIII in FIG. 13.
Figure 15:
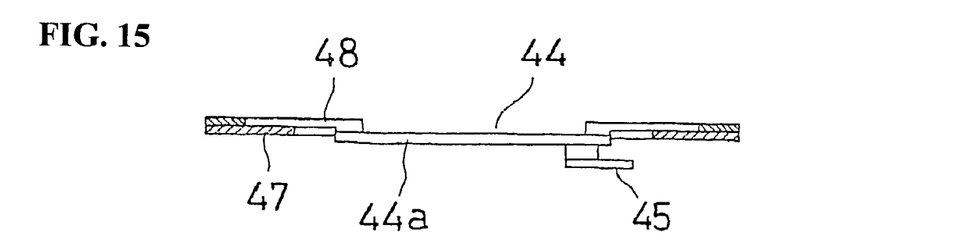
FIG. 15 is a cross-sectional view taken along the line IX—IX in FIG. 13.

FIGS. 13 to 15 show an adapter 41 of the fifth suitable embodiment which can be preferably used for an automatic copying machine (duplicator). The adapter main body 46 includes a lower half member 47 to be fixed to the disk-transferring tray 71 and an upper half member 48 to be disposed on the lower half member 47 with the front end portion thereof connected to that of the lower half member via a hinge portion 49. The lower half member 47 is provided with a positioning central aperture 42 in which an optical disk (C1) smaller than an 8 cm-optical disk can be inserted in a non-restricted state and a cutout 43 continuing from the central aperture 42 for allowing the movement of the optical pickup 86. The diameter of the external periphery is set to be 12 cm.

The upper half member 48 has an inner periphery having a diameter larger than the inner diameter of the lower half member 47, and is provided with a disk clamper passing dented portion 44 and an optical disk entering prevention protrusion 44a at its rear end portion. Furthermore, on the lower surface of the optical disk entering prevention protrusion 44a, a protruded portion 45 that comes into contact with the chassis 82 of the driving unit 81 is protruded.

Unlike the adapters 1, 11, 21 and 31 of the first to fourth embodiments, in the adapter of this fifth embodiment 41, the lower half member 47 is fixed to the upper surface of the 12 cm-disk placing dented portion 72 of the disk-transferring tray 71 in advance. The fixing method thereof is not specifically limited, and may be, for example, fixed by adhering the lower half member 47 to the 12 cm-disk placing dented portion 72 via a double-sided adhesive tape or by fixing thereto by a screw. Alternatively, a projection downwardly protruded from the lower surface of the lower half member 47 may be fitted in a fitting aperture formed in the 12 cm-disk placing dented portion 72. According to the adapter 41 of this fifth embodiment, since the upper half member 48 is connected to the lower half member 47 fixed to the upper surface of the 12 cm-disk placing dented portion 72 with the front end portions thereof connected with each other via the hinge, even if vibrations from the arm driving unit for transferring CDs are transmitted to the automatic copying machine in the state where the rear end portion of the upper half member 48 is lifted by the chassis 82 of the driving unit 81 via the protruded portion 45, the adapter 41 will not cause resonance and/or rolling. Accordingly, it can be assuredly prevented from occurring the damages of the CD and/or the inside of the player which may be caused by an unexpected contact of the adapter to the rotating CD.

What is claimed is:

1. An optical disk adapter, comprising an external periphery having a size capable of being fitted in a 12 cm-disk placing dented portion (72) of a disk-transferring tray (71) in a disk player (P) and a positioning central aperture (2) (22) (32) (42) in which an optical disk (C1) (C2) (C3) having a size smaller than that of a 12 cm-optical disk is fitted in a non-restricted state, a center of the positioning central aperture (2) (22) (32) (42) and that of an adapter main body (1a) being positioned concentrically, wherein the optical disk adapter is provided with a dented portion (4) for allowing a relative passing of a disk damper (85) in the disk player (P) at an upper surface thereof and a rotation prevention member (3) for preventing a rotation of the optical disk adapter against the disk-transferring tray (71) at a lower surface thereof, and wherein the optical disk adapter is provided with an optical disk entering prevention protrusion (3a) on a lower surface of the disk damper passing dented portion (4) and a protruded portion (5) which comes into contact with a driving unit (81) which holds an optical pickup (86) and a disk turntable (83), and wherein the optical disk adapter is supported in a state in which a rear end of the adapter is lifted from a bottom surface of the 12 cm-disk placing dented portion (72) when a driving unit (81) is lifted.

2. The optical disk adapter as recited in claim 1, wherein the protrusion (5) comes into contact with an upper surface of a chassis (82) of the driving unit (81).

3. The optical disk adapter as recited in claim 1, wherein the protrusion (5) comes into contact with an upper surface of an optical pickup guide shaft (87).

4. An optical disk adapter, comprising an external periphery having a size capable of being fitted in a 12 cm-disk placing dented portion (72) of a disk-transferring tray (71) in a disk player (P) and a positioning central aperture (2) (22) (32) (42) in which an optical disk (C1) (C2) (C3) having a size smaller than that of a 12 cm-optical disk is fitted in a non-restricted state, a center of the positioning central aperture (2) (22) (32) (42) and that of an adapter main body (1e) being positioned concentrically, wherein an adapter main body (46) comprises a lower half member (47) to be fixed to the disk-transferring tray (71) and an upper half member (48) connected to the lower half member (47) with a front end portion thereof connected to that of the lower half member via a hinge portion (49), wherein the lower half member (47) is provided with a positioning central aperture (42) in which an optical disk (C1) smaller than an 8 cm-optical disk is fitted in a non-restricted state and a cutout (43) continuing from the central aperture (42) for allowing a movement of an optical pickup (86), and wherein the upper half member (48) is provided with a disk damper passing dented portion (44), an optical disk entering prevention protruded portion (44a) and a protruded portion (45) which comes into contact with a driving unit (81).

5. An optical disk adapter comprising:

a circular frame (1a) having a substantially uniform width around its circumference and including an outer periphery sized to fit in a 12 cm diameter recess of a disk transferring tray of a disk player, the circular frame (1a) further having a central aperture (2) concentric therewith to receive an optical disk of a smaller size than 12 cm, wherein the optical disk is in a non-restricted state;

a stepped portion (4) of the circular frame (1a) for allowing relative passing of a disk clamper of the disk player over an upper surface of the circular frame (1a);

a gripping edge (3) at a lower surface of the circular frame (1a) to prevent rotation of the optical disk adapter inserted in the disk transferring tray of the disk player;

a first protrusion (3a) on the lower surface of the circular frame (1a) adjacent to the stepped portion (4) preventing the optical disk from passing through the central aperture (2); and a second protrusion (5) attached to the stepped portion (4) at the lower surface of the circular frame (1a) for contacting a driving unit of the disk player to provide a separation of at least the stepped portion (4) of the optical disk adapter from the recess of the disk transferring tray when lifting the driving unit for operation of the disk player.

* * * * *